Dec. 1, 1931. P. M. STIVENDER 1,834,079
PRESSURE INDICATOR
Filed Feb. 5, 1929

Inventor
P. M. Stivender
by George M. Albrecht
Attorney

Patented Dec. 1, 1931

1,834,079

UNITED STATES PATENT OFFICE

PAUL M. STIVENDER, OF WEST ALLIS, WISCONSIN

PRESSURE INDICATOR

Application filed February 5, 1929. Serial No. 337,605.

This invention relates to fluid-pressure indicators. One embodiment of the invention is particularly applicable to the indication of the air pressure in pneumatic tires as used in automotive vehicles. The invention may also be utilized for the indication of hydrostatic head and the like.

One of the objects of the invention is the provision of an indicator which has what may be termed a critical point, that is, an abrupt change in its indication is produced when the fluid pressure reaches a predetermined value.

Another object is the provision of an indicator which may be permanently connected to a pneumatic tire and which will indicate at a glance, without the reading of graduations and the like and without close inspection, whether a tire is in need of air.

A further object is the provision of an indicator which may be read with equal facility no matter what the position of the tire valve stem may be, and more specifically which may be read by a person in a standing position in the neighborhood of the vehicle wheel.

Other objects will appear hereinafter as the description of the invention proceeds.

The novel features of the invention will appear from this specification and the accompanying drawings forming a part thereof and disclosing several embodiments of the invention, and all these novel features are intended to be pointed out in the claims.

In the drawings Fig. 1 is a sectional elevation of a pressure indicator embodying the invention.

Figure 1:
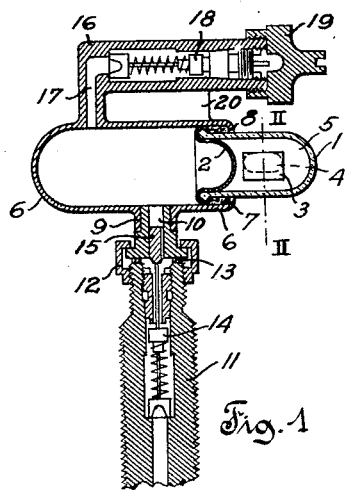

Referring to Fig. 1 of the drawings, the pressure indicator as here shown includes a chamber 1 indicated as being made of a glass tube in part. Other suitable materials such as celluloid, phenolic condensation products etc. may be utilized if desired. The chamber also includes a flexible wall 2 which may be a rubber bag-like member or metal bellows disposed about the end of the glass tube 1. The glass tube 1 is here shown as having its end formed with a small bead to better hold the flexible wall 2 in position.

Figure 2:
Fig. 2 is a section along the line II—II of Fig. 1.

The chamber 1 has disposed therein a float or diver 3 which is here shown, as may be seen best from Fig. 2, as including a flexible bag-like member 4, in this instance containing air, and sealed in any suitable manner. The bag-like member 4 thus constitutes a member which will have its volume decreased under increased pressure and will return to its original volume when the original pressure obtains. The bag 4 is cemented or fastened in any suitable manner to the inside of the diver 3 and as indicated in Fig. 2 is eccentric with the diver 3. The float or diver therefore will be disposed in a liquid 5 with which the chamber 1 is filled, with a definite side upward at all times, for a purpose which will be hereinafter set forth.

The chamber 1 may be held in a tubular member 6 by means of cement 7. The tubular member 6 is here shown as having a crimped portion 8 to better hold the chamber 1. The tubular member 6 is provided with a neck 9 having a passage 10. The neck 9 may be applied in any suitable manner to the source of fluid under pressure, the pressure of which is to be indicated. In this instance the neck 9 is shown as applied to the valve stem of a pneumatic tire, by means of a universal screw joint 12, a gasket 13 being provided to make the joint air tight. The valve stem 11 contains the usual valve core or inside 14. The neck 9 is provided as here shown, in the passage 10, with a plug 15 provided with a channel as indicated on the right hand side of the plug. The plug 15 is for the purpose of depressing the stem of the valve core to open the valve when the neck 9 is applied to the valve stem 11, thereby opening communication between the source of fluid pressure and the inside of the tubular member 6.

The tubular member 6 is here shown as provided with an elbow pipe 16 having a passage 17 communicating with the interior of tubular member 6. The elbow pipe 16 is provided with a valve core 18 which is normally closed. A tire valve cap 19 may be provided for the end of the pipe 16. As here shown the pipe 16 may be joined to the tubular member 6 by a web 20.

Figure 3:
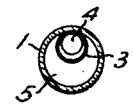
Fig. 3 is a similar section but with one of the parts in a different position.

Assuming the pressure indicator to be applied to a tire valve stem as shown in Fig. 1 and the valve 18 to be closed, the air pressure within the tubular member 6 is the same as that within the tire and acts against the flexible wall 2 thereby placing the liquid 5 under compression. The compression on the liquid 5 in turn compresses the bag-like member 4 and the air therein thereby decreasing the volume and therefore the buoyancy of the float or diver as a whole. At a predetermined pressure the diver 3 sinks in the liquid 5. The diver is shown in Figs. 1 and 2, as not quite on the bottom of the chamber, but it is so delicately poised that it will sink to the bottom of the chamber once it starts to sink under a predetermined pressure. When the pressure in the tire decreases, the consequent reduction of pressure the flexible wall 2 will relieve the pressure on the bag-like member 4 thereby permitting the air therein to expand and the consequent increase in buoyancy will cause the diver to rise to the position shown in Fig. 3 in which the diver is in contact with the wall of the chamber 1. It has been found that with a predetermined desired pressure against the flexible wall 2, only a very slight reduction in pressure is required to cause the diver to rise to the position as shown in Fig. 3 in which the red indication is given.

In order to better show the state of pressure of the air in the tire, the liquid 5 may be blue, for example, and the diver may have its upper portion colored red and its lower portion blue. It is however not essential that the upper and lower portions of the diver be of different colors. When the diver 3 is in the position shown in Fig. 2 it is invisible for the reason that the red portion thereof does not show through the blue liquid. When, however, the diver is in the position shown in Fig. 3, there is substantially no liquid between its upper red surface and the transparent wall of the chamber, so that the red portion is clearly visible, thus giving a readily visible indication of the fluid pressure which is being tested.

It will be noted that the pressure indicator as shown in Fig. 1 is preferably mounted on the valve stem 11 so that the axis of the chamber 1 is parallel to the axis of the wheel (not shown). Inasmuch as the diver 3 is always disposed in the liquid 5 with a definite side uppermost it is immaterial whether the valve stem 11 is projecting downwardly, upwardly or in fact in any radial direction from the wheel rim; the red portion of the diver will always be presented toward an observer standing next to the wheel and looking downwardly at it.

Figure 4:
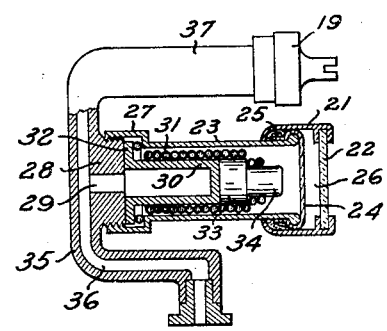
Fig. 4 is a part sectional elevation of another form of pressure indicator embodying the invention.
Figure 5:
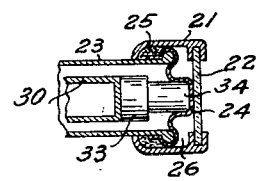
Fig. 5 is a detail view of a portion of the form of indicator shown in Fig. 4, with the parts in a different position.

Referring now to Fig. 4, the pressure indicator here shown includes a chamber 21 which may be of metal, provided with a glass window 22. The chamber 21 has its walls disposed about a tubular member 23. The end of the tubular member 23 has stretched across it a rubber diaphragm 24. The chamber walls 21 may be fastened to the member 23 by means of cement 25. The space 26 is filled with a liquid. The color of the liquid and that of the diaphragm 24 are preferably different, the liquid being, for example, red and the diaphragm blue.

The tubular member 23 has an enlarged portion 27 in threaded engagement with a boss 28. The boss 28 has a passage 29 which communicates with a flexible member indicated as a rubber bag 30. The rubber bag is surrounded by means of a spring 31 here shown as having an enlarged turn disposed between the shoulder formed by the enlarged portion 27 and an outwardly extending portion 32 of the rubber bag 30. The tubular member 23 therefore serves to hold the bag 30 and spring 31 in position against the boss 28.

The spring 31 has a few turns of reduced diameter at the right hand end thereof as viewed in Fig. 4, and these turns surround a reduced portion 34 of a plunger 33 which is in engagement with the end of the rubber bag 30.

The boss 28 is shown as associated with a pipe 35 having a passage 36 communicating with the passage 29. A portion 37 of the pipe 35 also communicates with the passage 36 and may contain a valve similar to the valve 18 in Fig. 1. The pipe 36 is of course adapted to be applied to a source of pressure in the same manner as described in connection with Fig. 1.

When there is a predetermined fluid pressure within the bag 30 the plunger 33 is moved against the rubber diaphragm 24 thereby forcing the head 34 of the plunger against the diaphragm, pressing the diaphragm against the inside of the glass window 22. Looking toward the window 22 the observer will then see a blue spot surrounded by a red border, assuming the diaphragm to be blue and the liquid red. It is of course apparent that other color combinations may be chosen. Upon reduction in pressure within the bag 30 to a predetermined amount the plunger head 34 will permit the diaphragm 24 to leave the window 22 thus permitting the red liquid to again flow into the space between the window and the diaphragm. The blue spot is therefore no longer visible and this at once gives an indication of the lack of proper pressure in the tire.

It will be apparent that the indication given in the form of the invention shown in Fig. 4 is also very readily visible to a person standing in the neighborhood of the wheel to which it may be applied, no matter what the position of the valve stem may be.

Figure 6:
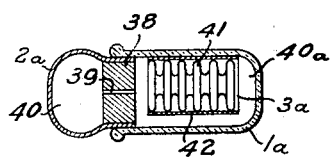
Figs. 6 and 7 are fragmentary views of modified indicators.

Referring to Fig. 6 this shows modified parts which may be used in place of certain parts of the device illustrated in Fig. 1. The chamber $1_a$ corresponds to chamber 1 in Fig. 1 and contains a diver $3_a$. The chamber is provided with a flexible metal or rubber wall $2_a$ which in the instance shown is held in position by means of a suitable plug 38 provided with one or more small passages 39. The spaces 40 and $40_a$ within the wall $2_a$ and chamber proper $1_a$ are filled with a liquid. Pressure placed upon the wall $2_a$ places the liquid in space $40_a$ under pressure and the operation is as already described in connection with Fig. 1. If the chamber $1_a$ should break, the air in the tire, to which the pressure responsive device may be applied, will not be lost because the wall $2_a$ will be stopped by the plug 38, and cannot blow out even if made of rubber, through the small opening 39.

The diver $3_a$ is of modified form and may of course be utilized in place of the diver 3 of Fig. 1. It is here shown as made of a sealed metal bellows 41 which is adapted to decrease and increase in volume either by reason of its own resilience alone or because of air or other gas, or a quantity of volatile liquid such as ether, or alcohol, contained therein. The bellows 41 may be mounted within a cylinder 42 which is here shown as concentric with the bellows 41. In this case the indicating color on the cylinder may extend uniformly completely around the same because there is little tendency for the diver to present the same portion of its surface upwardly at all times. The cylinder 42 or bellows 41 may be made quite large compared to the inside diameter of the chamber $1_a$, so that a large portion of its colored surface will be visible when it is in contact with the chamber wall. The cylinder 42 may be omitted, and the bellows colored.

Figure 8:
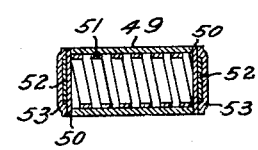
Fig. 8 is a detail of modified form.

A modified form of diver is illustrated in Fig. 8. The diver here shown comprises a rubber tube 49 the ends of which are sealed by rubber discs 50 cemented in place. Within the tube 49 is disposed a spring 51 made of celluloid or other suitable material. The spring maintains the form of the tube 49 but permits it to be compressed longitudinally. The spring thus serves to return the diver to its original volume when the pressure is removed independently of any gas in the tube. The end walls of the diver may be strengthened by discs of celluloid 52, for example, which may be held in position by rubber discs 53 cemented in place.

Figure 7:
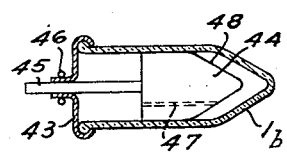

Referring to Fig. 7, this shows a further modification in which the chamber $1_b$ corresponds to chamber 1 of Fig. 1 except that the former is provided with a conical or wedge-shaped end portion as shown. The chamber is provided with a flexible wall 43 suitably held to the open end of chamber $1_b$. A plunger 44 is disposed in the chamber, and has a conical or wedge-shaped end adapted to approximately fit the end of the chamber. The plunger has a stem 45 which is suitably fastened to the wall 43 and may if desired pass through said wall as shown. If the stem passes through the wall it may be fastened thereto by a liquid tight joint as by means of a clamp 46. The plunger may be provided with a small passage 47 which places bodies of liquid to the right and left of the plunger in communication. When the wall 43 is placed under pressure the plunger is moved to the right until it contacts with the chamber wall the liquid being displaced. The portion 48 of the plunger (or the entire plunger) may be of a different color from the liquid so that under the stated conditions the surface 48 is visible in contrast to the liquid. When the pressure decreases to a predetermined amount the flexible wall draws the plunger toward the left and the colored liquid flows to the right through passage 47 thereby again covering the surface 48 of the plunger.

It will be apparent that in the forms of the invention illustrated the indicator has a critical point. This is particularly marked in the forms utilizing a diver as set forth. Also because the indication is given by a member between which and the wall with which it substantially contacts, there is a thin film of liquid which seems to exert an adhesion effect, so that the motion of the member away from the wall is comparatively abrupt. Also very little motion is necessary because only a small layer of colored liquid is necessary to cause the dissimilarly colored member to disappear from view.

It should be understood that it is not desired to limit the invention to the exact details of construction shown and described, for obvious modifications may occur to persons skilled in the art.

It is claimed and desired to secure by Letters Patent:

1. A fluid pressure indicator including a closed chamber containing a liquid, a second chamber, means for placing in communication with said second chamber the fluid the pressure of which is to be indicated, and means including a flexible wall for said first named chamber exposed to the action of the fluid under pressure in said second chamber for indicating the degree of said pressure.

2. A fluid pressure indicator including, a closed chamber containing a liquid, a second chamber, means for placing in communication with said second chamber the fluid the pressure of which is to be indicated, and means including a flexible wall for said first named chamber serving as one wall of said second chamber for indicating the degree of said pressure.

3. In a fluid-pressure indicator, a body of colored liquid, a transparent wall forming a boundary for said liquid, and means movable with respect to said wall subjected to the fluid under pressure for displacing the liquid away from said wall to thereby make the degree of said pressure visible.

4. In a fluid-pressure indicator, a body of colored liquid, a transparent wall forming a boundary for said liquid, and means subjected to the fluid under pressure including a member having a color different from said liquid movable with respect to said wall whereby said member is visible when the pressure is above a predetermined amount and is invisible when the pressure is below a predetermined amount.

5. A fluid pressure indicator including, a closed chamber containing a liquid, a second chamber, means for placing in communication with said second chamber the fluid the pressure of which is to be indicated, and means for indicating the degree of said pressure including a flexible wall for said first named chamber and a buoyant member disposed in said liquid, the buoyancy of which member depends upon the pressure upon said flexible wall.

6. A fluid pressure indicator including, a closed chamber containing a liquid, a second chamber, means for placing in communication with said second chamber the fluid the pressure of which is to be indicated, and means for indicating the degree of said pressure including a flexible wall for said first named chamber and a buoyant member disposed in said liquid comprising a compressible and expansible member whereby the amount of liquid it displaces varies with the pressure on said flexible wall.

7. A fluid pressure indicator for pneumatic vehicle-tires, including a chamber having a transparent wall, said chamber having a longitudinal axis parallel to the axis of the tire, a second chamber, means for supporting said chambers from the valve stem of the tire and for placing said second chamber in communication with the inside of said tire, and means whereby the state of air pressure in said second chamber is made visible through said transparent wall.

8. In a fluid-pressure indicator, a chamber containing a liquid and having a transparent wall and a flexible wall, means whereby said flexible wall is exposed to the fluid under pressure, means including a buoyant member disposed in said liquid, the buoyancy of which member depends upon the pressure upon said flexible wall, and means for weighting said buoyant member so that it is disposed in said liquid with a predetermined side uppermost, the color of said upper side being different than that of said liquid.

9. In a fluid-pressure indicator, a chamber containing a colored liquid and having a transparent wall and a flexible wall, means whereby said flexible wall is exposed to the fluid under pressure, and a buoyant member disposed in said liquid, the buoyancy of which member depends upon the pressure on said flexible wall, at least a portion of said buoyant member being colored differently from said liquid.

10. In a fluid-pressure indicator of the type described, a buoyant member comprising a compressible and expansible sealed bellows-like corrugated metal capsule.

11. In a fluid-pressure indicator of the type described, a buoyant member comprising a compressible and expansible member including a sealed flexible capsule, and a spring disposed within said capsule.

12. In a fluid-pressure indicator, a chamber containing a colored liquid and having a transparent wall, means whereby said liquid is exposed to the pressure to be indicated, and a buoyant member disposed in said liquid, the buoyancy of which member depends upon said pressure, at least a portion of said buoyant member being colored differently from said liquid.

13. In a fluid-pressure indicator, a chamber having a transparent wall and a flexible wall, means including a fluid in said chamber for rendering the degree of pressure on said flexible wall visible through said transparent wall, and a partition between said chamber walls, said partition having a predetermined number of openings serving to put the bodies of fluid on opposite sides of said partition in communication.

14. In a fluid pressure indicator, a closed chamber containing a fluid, means whereby an exterior portion of said chamber is exposed to the fluid under pressure, and means including a flexible wall for said chamber at said exposed portion of said chamber for indicating the degree of said pressure.

15. In a fluid pressure indicator, a body of liquid, means for placing said liquid under pressure, and hollow hermetically sealed buoyant means disposed in said liquid, said means including at least one wall adapted to flex under pressure on said liquid to thereby alter the buoyancy of said means.

16. In a fluid pressure indicator, a body of liquid, means for placing said liquid under pressure, and hollow hermetically sealed buoyant means disposed in said liquid, said means including at least one pair of approximately parallel walls adapted to flex under pressure on said liquid to thereby alter the buoyancy of said means.

17. In a fluid pressure indicator, a body of liquid, means for placing said liquid under pressure, and hollow hermetically sealed buoyant means disposed in said liquid, said means including a plurality of cells each cell having at least one wall adapted to flex under pressure on said liquid to thereby alter the buoyancy of said means.

18. In a fluid pressure indicator of the type described, a buoyant member comprising a compressible and expansible sealed corrugated capsule.

19. In an indicator, a body of colored liquid, a transparent wall forming a boundary for said liquid, and means movable with respect to said wall for displacing the liquid away from said wall to thereby make visible said movement of said means.

20. In an indicator, a body of colored liquid, a transparent wall forming a boundary for said liquid, a member having a surface submerged in said liquid and facing said wall said surface having a color different from said liquid, and means for moving said surface into engagement with said wall to thereby make said surface visible.

In testimony whereof, the signature of the inventor is affixed hereto.

PAUL M. STIVENDER.